(12) United States Patent
Kase et al.

(10) Patent No.: US 7,233,470 B2
(45) Date of Patent: Jun. 19, 2007

(54) DISTANCE RELAY APPARATUS

(75) Inventors: Takahiro Kase, Tachikawa (JP); Hidenari Amo, Fuchu (JP); Tetsuo Matsushima, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 316 days.

(21) Appl. No.: 10/614,832

(22) Filed: Jul. 9, 2003

(65) Prior Publication Data

US 2004/0008458 A1    Jan. 15, 2004

(30) Foreign Application Priority Data

Jul. 9, 2002    (JP) .............................. 2002-200246

(51) Int. Cl.
*H02H 3/00*    (2006.01)

(52) U.S. Cl. .............................. 361/80; 361/94; 702/59

(58) Field of Classification Search .................. 361/80, 361/94, 95, 96, 97; 702/59
See application file for complete search history.

(56) References Cited

U.S. PATENT DOCUMENTS

| | | | | |
|---|---|---|---|---|
| 4,419,737 A | * | 12/1983 | Yamaura et al. ............ | 713/500 |
| 4,591,992 A | * | 5/1986 | Yamaura ..................... | 702/59 |
| 4,774,621 A | * | 9/1988 | Andow ........................ | 361/80 |
| 5,325,061 A | * | 6/1994 | Schweitzer, III ............ | 324/522 |
| 5,796,630 A | * | 8/1998 | Maeda et al. ................ | 361/160 |
| 6,137,666 A | * | 10/2000 | Wang ........................... | 361/80 |
| 6,369,996 B1 | * | 4/2002 | Bo ............................... | 361/80 |
| 6,906,903 B2 | * | 6/2005 | Kurosawa et al. .......... | 361/119 |

FOREIGN PATENT DOCUMENTS

JP    3-270634    12/1991

OTHER PUBLICATIONS

Protection Relay, IEEJ, pp. 110-115.
IEEJ Technical Report No. 641, Jul. 1997, pp. 83-87.

* cited by examiner

*Primary Examiner*—Brian Sircus
*Assistant Examiner*—Terrence Willoughby
(74) *Attorney, Agent, or Firm*—Oblon, Spivak, McClelland, Maier & Neustadt, P.C.

(57) ABSTRACT

A distance relay apparatus includes a directional relay element which performs computation to detect a fault, which occurs in the forward direction from an installing point of the relay apparatus, based on a voltage and a current which are received from an object to be protected, a zone-1 distance relay element which performs computation to detect a fault within a predetermined zone, a fault detecting relay element which performs computation to detect a fault within a zone that is narrower than that of the zone-1 distance relay element in terms of data time length which is shorter than that used for the computation of the zone-1 distance relay element, and a logic element which outputs a relay signal in accordance with a detecting operation of the zone-1 distance relay element, the fault detecting relay element, and the directional relay element.

14 Claims, 10 Drawing Sheets

DISTANCE RELAY APPARATUS

BACKGROUND OF THE INVENTION

1. Field of the Invention

The present invention relates to a distance relay apparatus that protects a power system and, more particularly, to a distance relay apparatus that detects a close-up fault of a power system at high speed.

2. Description of the Related Art

A distance relay apparatus includes a directional relay element for determining the direction of the point of a fault viewed from the location of a relay element and a distance relay element for obtaining the distance from the location of the relay element to the point of the fault. By combining the directional relay element and the distance relay element with each other, the distance relay apparatus determines whether the fault occurs within a protective zone. Then, the distance relay apparatus outputs a circuit breaker trip signal immediately after it determines that the fault occurs within the protective zone.

Figure 25:
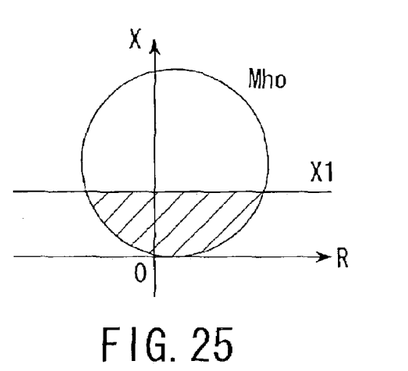
FIG. 25 is a diagram showing operating characteristics of a prior art distance relay apparatus.

FIG. 25 is a diagram of operating characteristics of a mho relay element that serves as a directional relay element and a reactance relay element that serves as a distance relay element. The characteristics are represented as an impedance plane. In FIG. 25, the overlapping portion of the characteristics of both the relays, or the hatched portion is a zone-1 protective region serving as a distance relay apparatus.

Figure 26:
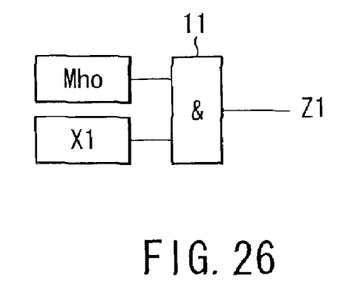
FIG. 26 is a diagram showing a logic sequence circuit from the output of each of relays to the zone-1 operating output in the prior art distance relay apparatus.

FIG. 26 shows a logic sequence circuit that outputs a zone-1 operating signal of the distance relay apparatus including both the mho relay element and the reactance relay element.

In FIG. 26, the mho relay element is denoted as Mho and the reactance relay element is denoted as X1. Reference numeral 11 indicates an AND circuit that operates when both of these relays operate (output an operating signal "1"). The AND circuit is so configured that it outputs a zone-1 operating signal Z1 of the distance relay apparatus.

Figure 27:
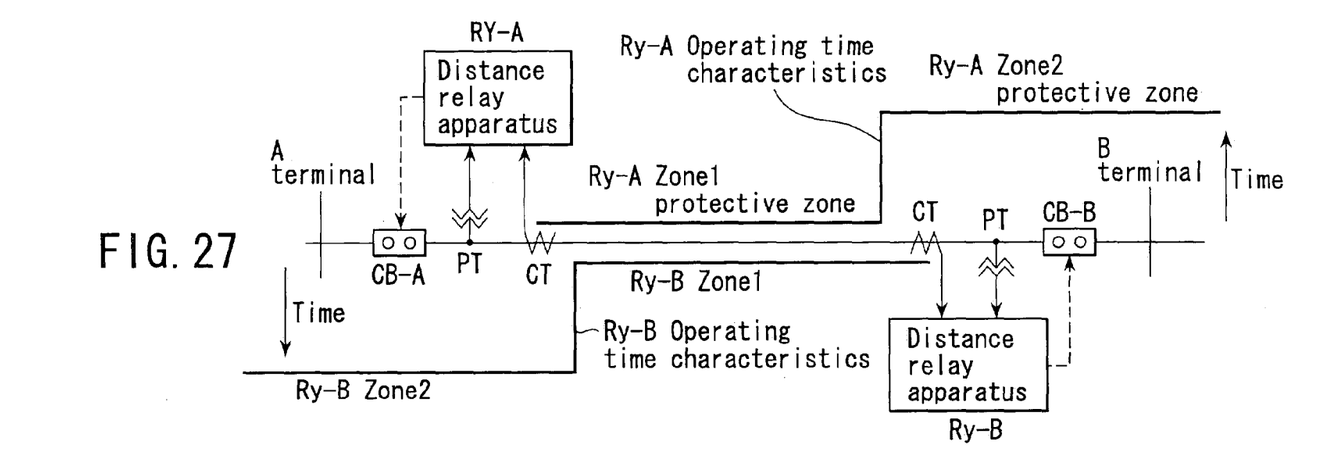
FIG. 27 is a diagram showing operating time of the prior art distance relay apparatus.

The protective zone of the reactance relay element X1 is generally set at about 80% of the entire length of a power transmission line from a terminal at one end to a terminal at the remote end. If the distance relay apparatus is used as a main protective apparatus, it needs to operate at high speed when a system fault occurs within the zone-1 operating zone of 80%. When a system fault occurs in the zone-2 operating zone of 20% that corresponds to the protective zone, the operating time of the distance relay apparatus is delayed by a timer such that the apparatus operates for backup protection. FIG. 27 shows zone-1 and zone-2 operating zones of distance relay apparatuses Ry-A and Ry-B that are provided at opposing A and B terminals, respectively.

When the distance relay element computes the distance from the location of the relay element to the point of a fault shorter than the actual distance because of an error due to the characteristics of an input transformer and an error in computation in a computing section, it trips even for a fault that occurs outside the original protective zone. This is called an overreach. The overreach may have a great influence on a power system. The distance relay element is therefore required to compute the distance to the point of a fault with high precision in order to prevent an overreach from occurring.

The directional relay element is also required to perform the same high-precision computation as the distance relay element because the directional relay element will trip though a reverse fault occurs if it makes an error in computation.

Figure 28:
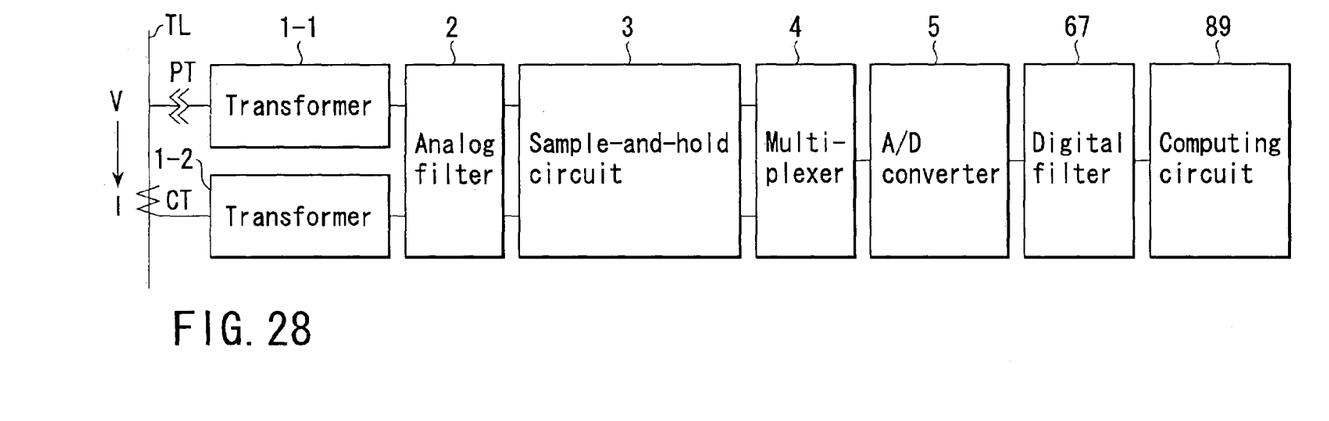
FIG. 28 is a block diagram of the prior art distance relay apparatus.

FIG. 28 is a block diagram of a distance relay apparatus that is configured by a digital protective relay. A power transformer PT and a current transformer CT transform voltage V and current I of a power system TL, respectively and auxiliary transformers 1-1 and 1-2 transform the voltage and current into ones each having a given level. The voltage and current are input to an analog filter 2 from the auxiliary transformers 1-1 and 1-2 and high-frequency noise is eliminated therefrom. The output of the analog filter 2 is supplied to a sample-and-hold circuit 3 and sampled at regular sampling intervals. A multiplexer 4 permutes the sampling outputs of the sample-and-hold circuit 3 in time series and an A/D converter 5 converts them into digital data. The digital data is input to a digital filter 67. The digital filter 67 serves to eliminate components that have an adverse influence on protective relay computation, e.g., DC components. Since the digital filter 67 is described in IEEJ Lecture on Protection Relay, p. 110, Table 6.1, its detail descriptions are omitted. A computing circuit 89 receives an output of the digital filter 67 and performs computations on the direction of a fault and the measurement of distance. The results of the computations are processed on the basis of given logic and output as an instruction of the relay element.

As a transfer function of the digital filter 67, the time length of data for use is increased and, in other words, a number of items of sampling data are used to make a higher-performance filter. On the other hand, a long time is required for filtering and a response is delayed.

To compute a current level in the computing circuit 89, there are a plurality of algorithms from a relay computation algorithm using a large number of items of sampling data to that using a smaller number of items of sampling data. Such a relay computation algorithm is described in, for example, IEEJ Technical Report No. 641, "Basic Technology of Protective Relay System," p. 85. If the computing circuit 89 uses a number of items of data by lengthening the data window of data (time length of data for use) like the digital filter 67, the computation precision is improved but the response is generally delayed.

As described above, it is necessary to select one resistant to noise, as a filter or a relay computing system in order to improve the precision of distance measurement, whereas operating time will be lengthened.

On the other hand, when a fault (close-up fault) occurs at a point close to the bus of a power system, a fault current is large and has a great influence on the power system. It is thus expected that a relay element will be operated at high speed. A conventional protective relay employs a number of data items in order to improve the precision of distance measurement for a fault that has occurred near the boundary of a protective zone (a fault that has occurred at a distance of 80% from a terminal at one end as described above). Consequently, even in a close-up fault that is likely to have an influence on the system, the operating time of the protective relay cannot be shortened.

BRIEF SUMMARY OF THE INVENTION

A distance relay apparatus according to an embodiment of the present invention detects a fault, which has occurred at a point close to the location of a relay, at high speed and outputs a trip signal while maintaining the same precision of distance measurement as that of a conventional apparatus in the vicinity of the boundary of a protective zone.

A distance relay apparatus according to one embodiment of the present invention samples an amount of electricity of a voltage and a current, which are received from an object to be protected, at regular intervals, converts the amount of electricity into digital data, receives the digital data to perform computations to detect the direction of a fault and measure the distance thereof, and outputs the results of the computations as a relay signal based on predetermined logic. The distance relay apparatus comprises a directional relay element which receives the digital data to perform computation to detect a fault, which occurs in the forward direction from an installing point of the relay apparatus, based on a computing equation, a zone-1 distance relay element which receives the digital data to perform computation to detect a fault within a predetermined zone viewed from the installing point of the relay apparatus, based on a computing equation, and a fault detecting relay element which receives the digital data to perform computation to detect a fault within a zone that is narrower than that of the zone-1 distance relay element in terms of data time length which is shorter than that used for the computation of the zone-1 distance relay element. The distance relay apparatus outputs a relay signal in accordance with a detecting operation of at least one of the zone-1 distance relay element and the fault detecting relay element and a detecting operation of the first directional relay element.

If the data time length used in the fault detecting relay element is shorter than that used in the directional relay element and the zone-1 relay element, the distance relay apparatus can detect a fault within a zone, which is much narrower than the protective zone of the zone-1 distance relay element, at high speed.

Additional advantages of the invention will be set forth in the description which follows, and in part will be obvious from the description, or may be learned by practice of the invention. The advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Embodiments according to the present invention will now be described with reference to the accompanying drawings. The same components are denoted by the same reference numerals and symbols throughout the drawings and their related components are denoted by the same reference numerals but different suffixes. The descriptions of the same components will not be repeated.

FIRST EMBODIMENT

Figure 1:
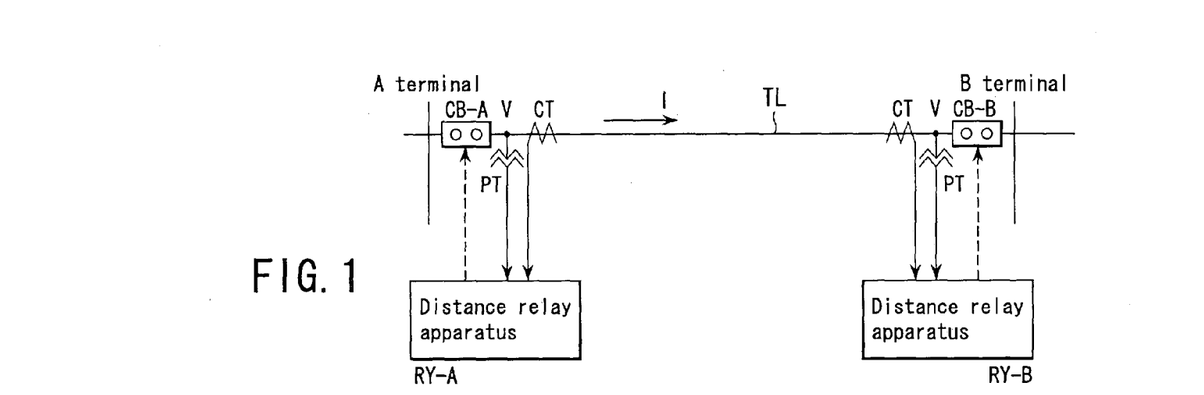
FIG. 1 is a diagram showing a relationship between each of distance relay apparatuses according to an embodiment of the present invention and an object to be protected.

A first embodiment in accordance with the present invention will now be described with reference to FIGS. 1 to 5. FIG. 1 is a diagram showing the status of distance relay apparatuses installed in a power system. In FIG. 1, TL represents a transmission line to be protected, which is connected between A and B terminals of the power system. The A and B terminals are provided with their respective distance relay apparatuses Ry-A and Ry-B for performing computations on the direction of a fault and the measurement of the distance to the point of the fault upon receipt of voltage V and current I from a power transformer PT and a current transformer CT.

Since the configurations and functions of the distance relay apparatuses Ry-A and Ry-B are the same, only the apparatus Ry-A will be described below.

Figure 2:
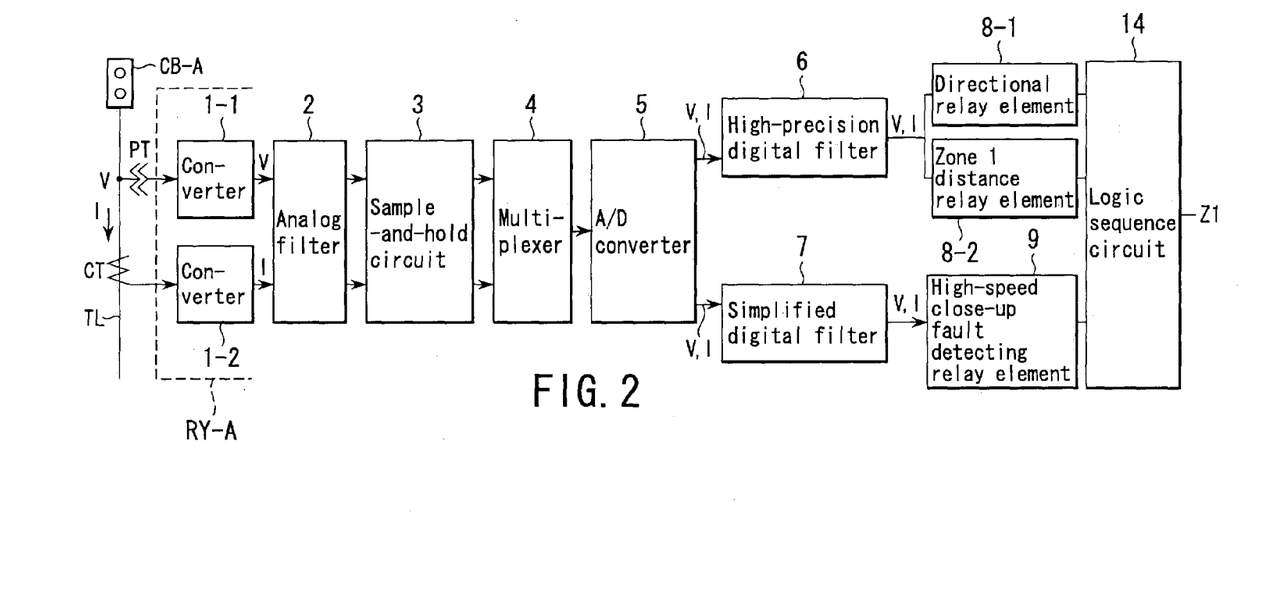
FIG. 2 is a block diagram of the distance relay apparatus according to the first embodiment of the present invention.

FIG. 2 is a block diagram of the distance relay apparatus according to the first embodiment of the present invention. As shown in FIG. 2, the voltage V and current I of the transmission line TL are input to an analog filter 2 from the power transformer PT and current transformer CT through auxiliary transformers 1-1 and 1-2. Noise of harmonic components is eliminated from the voltage and current input to the analog filter 2. The resultant voltage and current are sampled for every given period of time (e.g., an electrical angle of 15 degrees) by the sample-and-hold circuit 3 and permuted in time series by a multiplexer 4 at the next stage.

The sampling data of the voltage and current permuted in time series is converted into digital voltage data and digital current data by an A/D converter 5. After that, the digital voltage data and digital current data are supplied to their respective digital filters 6 and 7 of different types, which are one of features of the first embodiment of the present invention. The digital filters 6 and 7 eliminate frequency components that have an adverse influence on the computation.

Of the digital filters 6 and 7, the digital filter 6 has the same performance as that of a conventional one, whereas the digital filter 7 has a data window that is narrower than that of the digital filter 6 of the conventional type (or uses data whose time length is short). In the following descriptions, for the sake of convenience, the digital filter 6 of the conventional type is referred to as a high-precision digital filter and the digital filter 7 having a narrow data window (using a short time length of data) is referred to as a simplified digital filter.

The digital filter used in a digital protective relay apparatus includes a differential filter, an adder filter and an integrating filter. Of these filters, the differential filter will be described hereinafter.

Assume that the transfer function of the differential filter configuring the high-precision digital filter 6 is $(1-Z^{8q})$ and that of the differential filter configuring the simplified digital filter 7 is $(1-Z^{4q})$. 8q and 4q of these transfer functions represent filtering time for 8 items of sampling data and that for 4 items of sampling data, respectively.

If, a sampling interval is 15 degrees, the electrical angle required for filtering by the differential filter that configures the high-precision digital filter 6 is 15°×8=120°. On the other hand, the electrical angle required for filtering by the differential filter that configures the simplified digital filter 7 is 15°×4=60°. Representing these electrical angles as sampling values of current, the high-precision digital filter 6 is configured so as to process a data difference corresponding to an electrical angle of 120° as expressed by the equation $I_m = i_m - i_{m-8}$, whereas the simplified digital filter 7 having a narrow data window (a short window length) I configured so as to process a data difference corresponding to an electrical angle of 60° as expressed by the equation $I_m = i_m - i_{m-4}$.

Consequently, the computation using an output of the simplified digital filter 7 can be performed in a shorter time than the computation using that of the high-precision digital filter 6. There is no specific restriction on the interval for acquiring a difference in data; however, an error may increase if the interval is too short.

There now follows a description of a relay that is supplied with the digital data processed by a digital filter as described above.

The output of the high-precision digital filter 6 is supplied to both a directional relay element 8-1 and a zone-1 distance relay element 8-2. The directional relay element 8-1 is configured by the same mho relay element (Mho) as described in FIGS. 25 and 26. The zone-1 distance relay element 8-2 is configured by the same reactance relay element (X1) as described above.

The output of the simplified digital filter 7 is supplied to a fault detection relay element (specifically a high-speed close-up fault detection relay element) 9 that detects a close-up fault at high speed. The computation signal of each of the relays 8-1 and 8-2 is supplied to a logic sequence circuit 14 (which will be described in detail in FIG. 4) and then output as a zone-1 command Z1 of the relay.

The relay element 9 has a function of detecting a fault, which has occurred close to the location of the relay, at high speed. The relay element 9 in this embodiment adopts a mho relay element (S-Mho) as one example in which a setting value is set at not more than 50% of the entire length of the transmission line, which is much smaller than the setting value (80% of the entire length of the transmission line) of the zone-1 distance relay element X1 described above. In general, the mho relay element Mho detects a fault more quickly than the reactance relay element X.

As described above, the output of the simplified digital filter 7 is supplied to the high-speed close-up fault detection relay element 9. Therefore, the relay element 9 can acquire data necessary for detecting a fault in a shorter time and detect a close-up fault at higher speed than the directional relay element 8-1 and the zone-1 distance relay element 8-2.

The time length of data required for filtering of the digital filter 7 connected to the relay element 9 is set shorter than that of data required for filtering of the digital filter 6 connected to the relays 8-1 and 8-2. Thus, the relay element 9 can detect a fault in a zone that is much narrower than the protective zone of the zone-1 distance relay element 8-2 at high speed. If the relay element 9 is combined with the directional relay element 8-1 that is high in reliability, it can detect a close-up fault at high speed while ensuring reliability.

Figure 3:
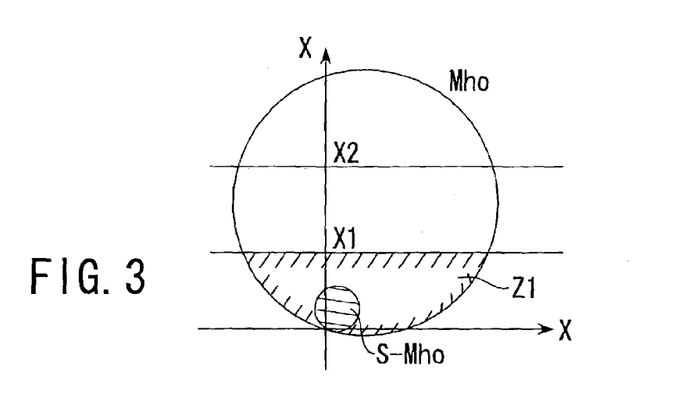
FIG. 3 is a diagram showing operating characteristics of the distance relay apparatus according to the first embodiment of the present invention.

FIG. 3 is a diagram of operating characteristics of the distance relay apparatus shown in FIG. 2. In FIG. 3, reference symbol Mho indicates a mho relay element configuring the directional relay element 8-1, and X1 and X2 indicate a reactance relay element configuring the zone-1 distance relay element 8-2 and a reactance relay element configuring a zone-2 distance relay element (not shown), respectively. S-Mho represents a mho relay element having a small setting value, which configures the high-speed close-up fault detection relay element 9.

In the first embodiment, the directional relay element (Mho) 8-1 and the high-speed close-up fault detection relay element (S-Mho) 9 may perform the same computation method. The window length of computation data (time length of data for use) of the relay element (S-Mho) 9 can be made shorter than that of computation data of the directional relay element (Mho) 8-1. If so, computation time is shortened and accordingly a fault may be detected at high speed.

To shorten the fault detection time of a relay, a computation system is modified, an averaging process is deleted, the number of times of operation confirmation is reduced, and the like.

The data time length required for computation of the fault detection relay element 9 is set shorter than that required for computation of the zone-1 distance relay element 8-2. Thus, the relay element 9 can detect a fault, which has occurred in a zone that is much narrower than the protective zone of the zone-1 distance relay element 8-2, at high speed. If the relay element 9 is combined with the directional relay element 8-1 that is high in reliability, it can detect a close-up fault at high speed while ensuring reliability.

Figure 4:
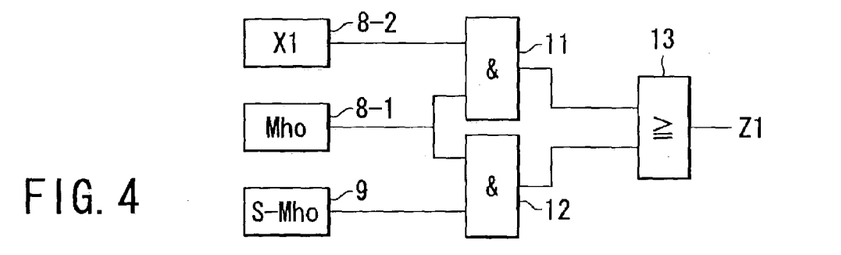
FIG. 4 is a diagram showing a logic sequence circuit from the output of each of the relays according to the first embodiment of the present invention to the zone-1 operating output.

FIG. 4 is a circuit diagram showing an example of the logic sequence circuit 14. In FIG. 4, reference numeral 11 indicates an AND circuit that causes an output when an AND condition is met between the directional relay element (mho relay element Mho) 8-1 and the zone-1 distance relay element (reactance relay element X1) 8-2. In the prior art described above with reference to FIG. 26, the output of the AND circuit 11 is caused as the zone-1 operating output of the distance relay apparatus as it is. In the first embodiment, an AND circuit 12 that causes an output when an AND condition is met between the high-speed close-up fault detection relay element (S-Mho) 9 and the directional relay element (Mho) 8-1 is added to the above prior art configuration. When at least one of the AND circuits 11 and 12 causes an output, it outputs a zone-1 operating signal Z1 of the distance relay apparatus through an OR circuit 13.

Figure 5:
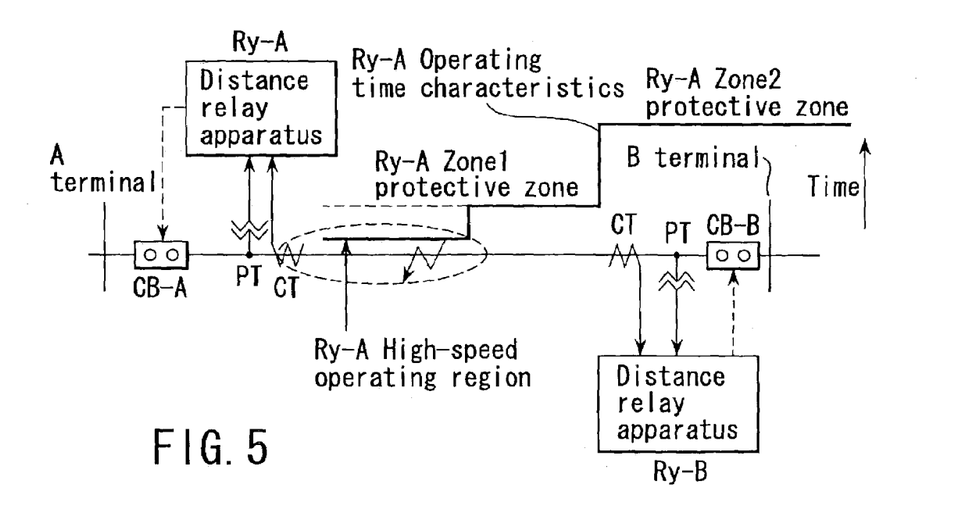
FIG. 5 is a chart of operating time of the distance relay apparatus according to the first embodiment of the present invention.

FIG. 5 is a chart of operating timing and a protective zone of the distance relay apparatus according to the first embodiment when a fault occurs. The distance relay apparatus of the first embodiment widely differs from the prior art shown in FIG. 27 in that it detects a close-up fault that has occurred in a zone of 50% of the zone-1 setting at higher speed than it outputs the zone-1 operating signal, as indicated by the circle of the broken line. Since the zone-1 operating signal is primarily output at high speed, the operating time of the apparatus is short. However, the operating time at the time of occurrence of a close-up fault is shorter than that of the zone-1 operation.

Consequently, the distance relay apparatus according to the first embodiment can detect a fault, which has occurred in a zone that is much narrower than the protective zone of the zone-1 distance relay element 8-2, at high speed by making the time length of data used in the fault detection relay element 9 shorter than that of data used in the directional relay element 8-1 and zone-1 distance relay element 8-2.

SECOND EMBODIMENT

Figure 6:
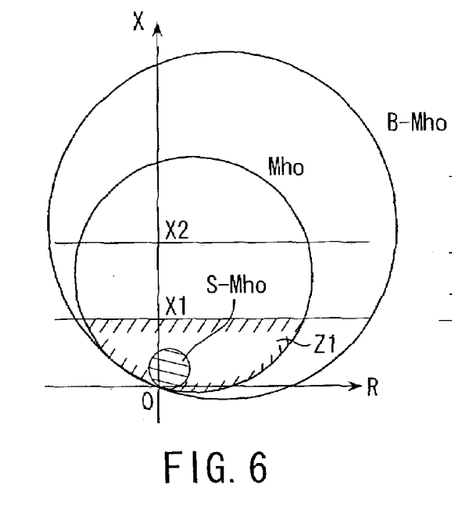
FIG. 6 is a diagram showing operating characteristics of a distance relay apparatus according to a second embodiment of the present invention.
Figure 7:
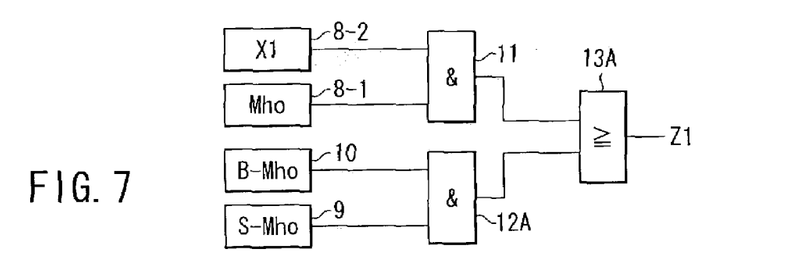
FIG. 7 is a diagram showing a logic sequence circuit from the output of each of relays according to the second embodiment of the present invention to the zone-1 operating output.

FIGS. 6 and 7 are diagrams related to a distance relay apparatus according to a second embodiment of the present invention. FIG. 6 is a diagram of operating characteristics of the distance relay apparatus, and FIG. 7 is a circuit diagram showing a logic sequence circuit for a zone-1 operation of the apparatus. Since the block diagram of the second embodiment is the same as that of the first embodiment, it is omitted.

The distance relay apparatus according to the second embodiment includes a third mho relay element (B-Mho) 10 having a large setting value as one exclusively for determining a direction of a fault. The reason for including the third mho relay element (B-Mho) 10 is as follows.

There is a case where the setting value of a mho relay element (Mho) of a directional relay element 8-1 should be decreased according to the conditions for installing a power system, e.g., when a transmission line to be protected is short. If the setting value is small, the operating time of the directional relay element (Mho) 8-1 is delayed and cannot catch up with a high-speed operation of a high-speed close-up fault detection relay element (S-Mho) 9. In the second embodiment, therefore, the third mho relay element (B-Mho) 10 having a larger setting value than that of the directional relay element (Mho) 8-1 is incorporated as one exclusively for determining a direction of the high-speed close-up fault detection relay element (S-Mho) 9 as illustrated in FIG. 6. Since the third mho relay element (B-Mho) 10 is not used as one different from the relay exclusively for determining the direction, an operating zone can be expanded irrespective of the system conditions.

The logic sequence circuit of the second embodiment shown in FIG. 7 differs from that of the first embodiment shown in FIG. 4 in that the third mho relay element (B-Mho) 10 having a large setting value is used in place of the directional relay element (Mho) 8-1 in order to detect an AND condition together with the high-speed close-up fault detection relay element (S-Mho) 9. Except for this, the second embodiment is the same as the first embodiment shown in FIG. 4. In FIG. 7, reference numeral 12A indicates an AND circuit for detecting an AND condition between the relays 9 and 10, and reference numeral 13A denotes an OR circuit for detecting an OR condition between the AND circuits 11 and 12A. The OR circuit 13A outputs a zone-1 operating signal Z1 according to which of the AND circuits 11 and 12A operates.

If both the mho relay element (B-Mho) 10 having a large setting value and the high-speed close-up fault detection relay element (S-Mho) 9 operate, a zone-1 operating signal is output. Thus, a high-speed operation can be maintained even though the setting value of the directional relay element (Mho) 8-1 is small.

The mho relay element (B-Mho) 10 is required to perform an operation at higher speed than the directional relay element (Mho) 8-1 as well as with the same precision as the relay element 8-1. This can be achieved if the setting value is set large.

In the second embodiment described above, the directional relays 8-1 and 10 having mho characteristics are used. A quadrilateral characteristic relay element having reactance characteristics may be used. When the high-speed close-up fault detection relay element 9 (incorporating the directional relay element 10 having a large setting value) having a direction determining capability is used as in the second embodiment, it can determine a fault by itself without detecting an AND condition together with the direction relay element 8-1.

THIRD EMBODIMENT

A distance relay apparatus according to a third embodiment of the present invention will now be described with reference to FIGS. 8 to 10.

Figure 8:
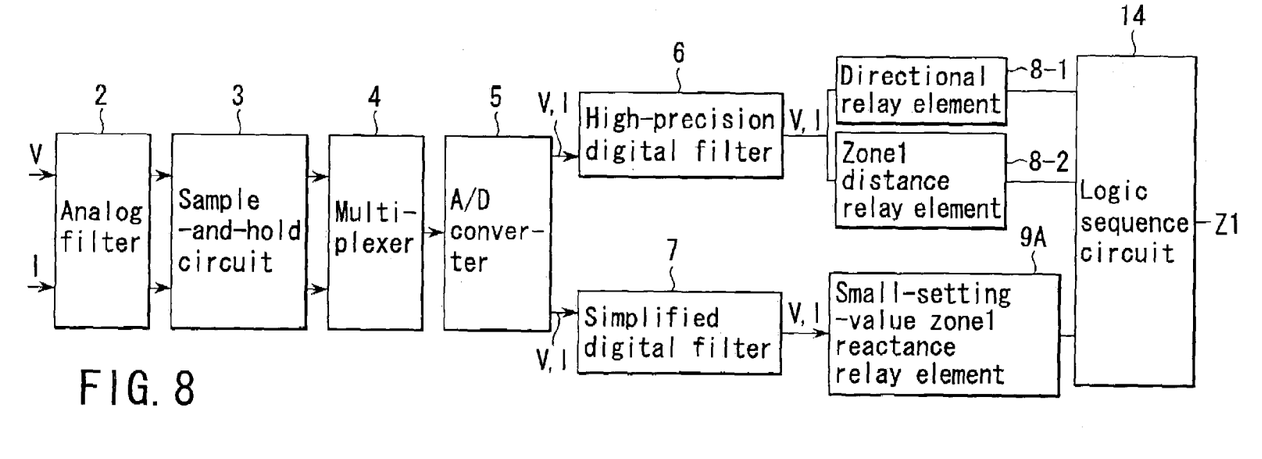
FIG. 8 is a block diagram of a distance relay apparatus according to a third embodiment of the present invention.

The components from an analog filter 2 to a zone-1 distance relay element 8-2 in FIG. 8 are the same as those of the first embodiment shown in FIG. 2. The third embodiment differs from the first embodiment in that a small-setting-value zone-1 reactance relay element (X1') 9A is adopted in place of the high-speed close-up fault detection relay element (mho relay element S-Mho) 9.

In the third embodiment, the setting value (X1') of the relay element 9A is set smaller than that (X1) of the relay element 8-2. Thus, the relay element (X1') 9A serves only to detect a close-up fault. However, the relay element (X1') 9A can operate at higher speed than the zone-1 distance relay element (X1) 8-2 since it uses data that is supplied through the above-described simplified digital filter 7.

Figure 9:
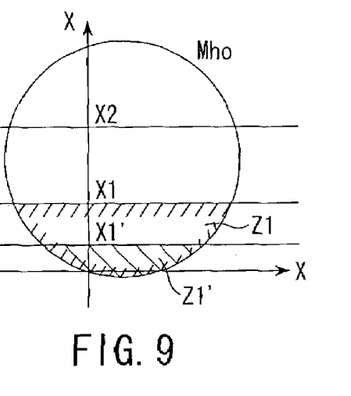
FIG. 9 is a diagram showing operating characteristics of a distance relay apparatus according to the third embodiment of the present invention.

FIG. 9 is a diagram of operating characteristics of the distance relay apparatus according to the third embodiment. In FIG. 9, symbols X1, X2 and Mho indicate the same as has been described above. Symbol X1' indicates the same reactance relay element as the relays X1 and X2, but the fault detecting zone of the relay element X1' is set narrower than that of the relay element X1. In FIG. 9, therefore, Z1' indicates a zone in which it is determined that a close-up fault has occurred.

Figure 10:
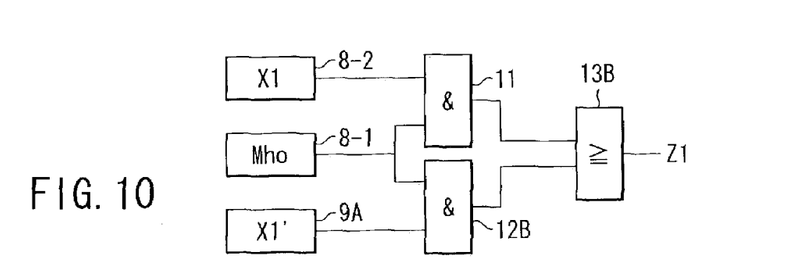
FIG. 10 is a circuit diagram showing a logic sequence circuit from the output of each of relays according to the third embodiment of the present invention to the zone-1 operating output.

FIG. 10 shows a logic sequence circuit according to the third embodiment. As compared with the distance relay apparatus according to the first embodiment shown in FIG. 4, the high-speed close-up fault detection relay element (S-Mho) 9 is replaced with the small-setting-value zone-1 reactance relay element (X1') 9A, and an AND circuit 12B detects an AND condition between the relay element 9A and the directional relay element (Mho) 8-1. Since the function of the distance relay apparatus of the third embodiment is substantially the same as that of the distance relay apparatus of the first embodiment, its descriptions are omitted.

If, the reactance relay element 9A having a smaller setting value than that of the zone-1 distance relay element 8-2 is used as a fault detection relay, a fault within a narrower zone may be detected at high speed.

The small-setting zone-1 reactance relay element (X1') 9A that detects only the close-up fault, used in the distance relay apparatus according to the third embodiment, can be applied to the distance relay apparatus according to the second embodiment shown in FIG. 7.

Figure 11:
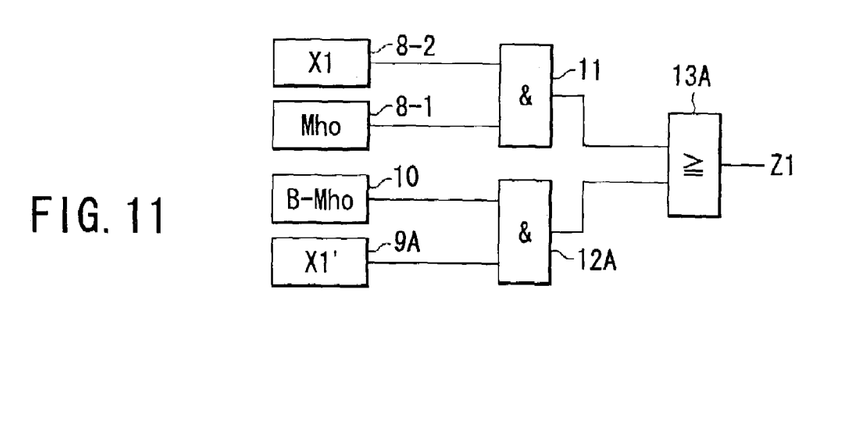
FIG. 11 is a diagram showing a logic sequence circuit from the output of each of relays to the zone-1 operating output when the third embodiment is applied to the second embodiment.

FIG. 11 is a diagram showing a logic sequence circuit from the output of each of relays to the zone-1 operating output when the small-setting-value zone-1 reactance relay element (X1') 9 according to the third embodiment is applied to the second embodiment. More specifically, as compared with the distance relay apparatus according to the second embodiment shown in FIG. 7, the high-speed close-up fault detection relay element (S-Mho) 9 is replaced with the relay element (X1') 9A and the AND circuit 12A detects an AND condition between the relay element 9A and the mho relay element (B-Mho) 10 exclusively for direction determination. As in the second embodiment, a high-speed operation may be maintained even though the setting value of the directional relay element (Mho) 8-1 is decreased according to the conditions for installing a power system, e.g., when a transmission line to be protected is short.

The zone-1 distance relay element 8-2 of each of the embodiments is formed as a relay having reactance characteristics. If, it is formed as a relay having mho characteristics, a relay having fewer mho characteristics has only to be one for detecting a close-up fault. The same is true of any other relays.

FOURTH EMBODIMENT

A fourth embodiment of the present invention will now be described with reference to the block diagram shown in FIG. 12.

In the fourth embodiment, a small-setting value impedance relay element 9B is used as a high-speed close-up fault detection relay.

Figure 12:
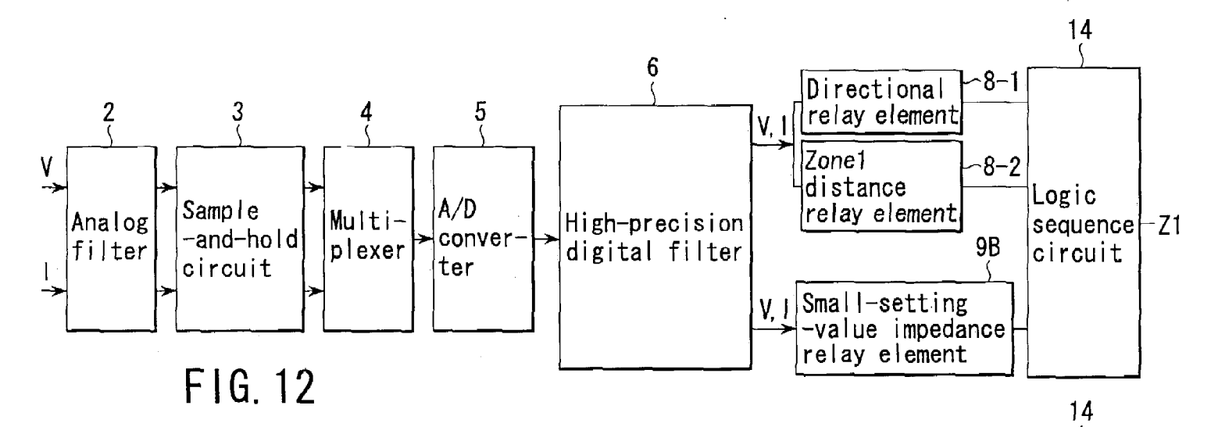
FIG. 12 is a block diagram of a distance relay apparatus according to a fourth embodiment of the present invention.

Since the components from an analog filter 2 to a directional relay element 8-1 in FIG. 12 are the same as those of the first embodiment shown in FIG. 2, their descriptions are omitted. A zone-1 distance relay element 8-2 adopts a differential approximation method as expressed by the following equations in order to keep the precision of distance measurement.

$$X = \frac{i_n v_{n-3} - i_{n-3} v_n}{i_n j_{n-3} - i_{n-3} j_n}$$

$$j = -i_{n-3}$$

where v and i indicate instantaneous values of a voltage and a current that are generated every 30 degrees of an electrical angle. In this case, the electrical angle of data required for computation of impedance Z is 180 degrees. In contrast, the small-setting-value impedance relay element 9B uses the same amount of electricity, which has passed through a high-precision filter 6, as the zone-1 distance relay element 8-2 does, but the following different equations are employed for computation.

$$V^2 = v_0^2 + v_{-3}^2$$

$$I^2 = i_0^2 + i_{-3}^2$$

$$Z^2 = V^2/I^2$$

In this case, the angle of data necessary for obtaining $Z^2$ is 90 degrees.

As described above, as compared with the zone-1 distance relay element 8-2, the length of data window necessary for distance measurement can be shortened by modifying the equations of the impedance relay element 9B. If the length of data window is shortened, the influence of an accident that has occurred in a system can be reflected on the results of computation in a short time, with the result that the operating time can be shortened.

Even though the computation methods of the zone-1 distance relay element 8-2 and the close-up fault detection relay element 9B are not modified, the time required until the final signal is output can be shortened by deleting an averaging process or reducing the number of times of operation confirmation.

The data time length required for the computation of the fault detection relay element 9B is set shorter than that required for the computation of the zone-1 distance relay element 8-2. Thus, the fault detection relay element 9B can detect a fault, which has occurred in a zone that is much narrower than the protective zone of the zone-1 distance relay element 8-2, at high speed. If the relay element 9B is combined with a direction determining relay element 8-1 that is high in reliability, it can detect a close-up fault at high speed while ensuring reliability.

When a high-speed close-up fault detection relay element (S-Mho) 9 is used as the fault detection relay element 9B, the same logic sequence circuit as that shown in FIG. 4 is obtained.

FIFTH EMBODIMENT

A fifth embodiment in accordance with the present invention will now be described with reference to FIGS. 13 to 15.

In the fifth embodiment, a high-speed undervoltage relay element (S-UV) 9C is used as a high-speed close-up fault detection relay.

Figure 13:
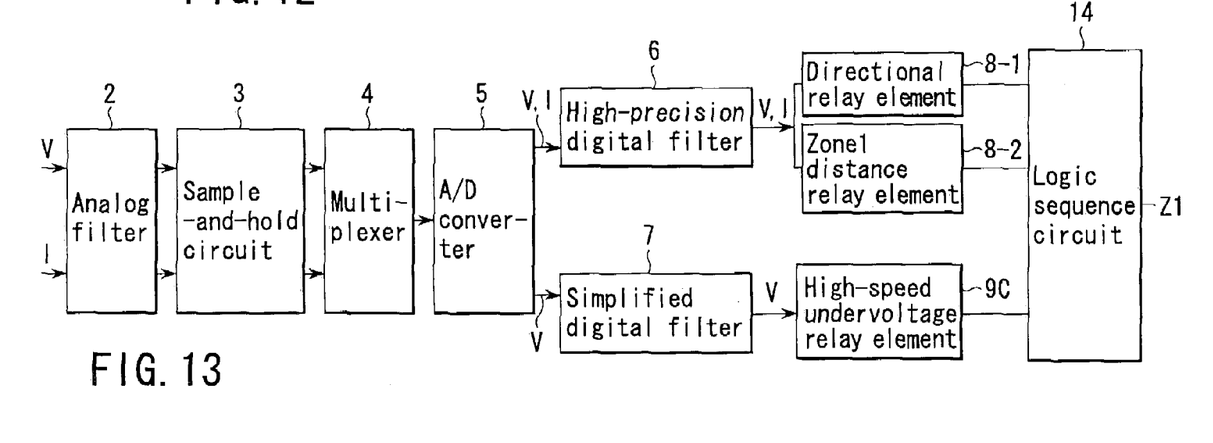
FIG. 13 is a block diagram of a distance relay apparatus according to a fifth embodiment of the present invention.

Since the components from an analog filter 2 to a zone-1 distance relay element 8-2 in FIG. 13 are the same as those of the first embodiment shown in FIG. 2, their descriptions are omitted. Though a simplified digital filter 7 of the fifth embodiment inputs/outputs voltage data, its configuration is the same as that of the first embodiment. The characteristics of the high-speed undervoltage relay element (S-UV) 9C and the reasons for using the relay element 9C will be described with reference to FIG. 14.

Figure 14:
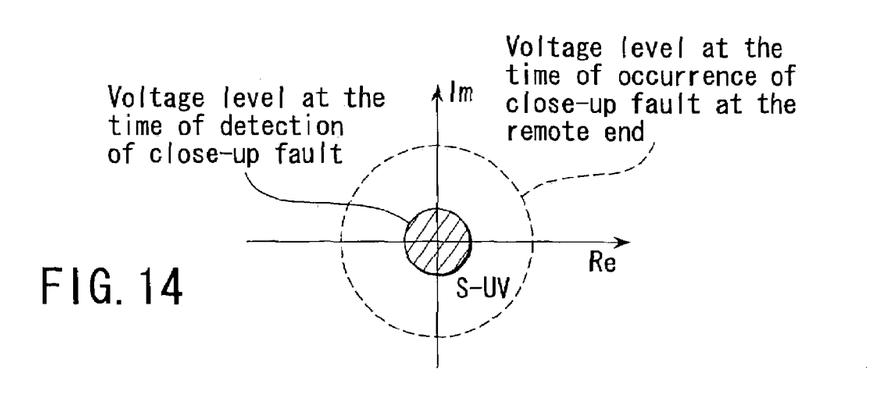
FIG. 14 is a diagram showing operating characteristics of a high-speed undervoltage relay element adopted in the fifth embodiment of the present invention.

In FIG. 14, the circle of the broken line represents a level of voltage remaining at a measurement end (A end) when a fault occurs at the remote end (e.g., B end) in the section to be protected. This voltage level depends upon the impedance behind the measurement end and the length (impedance) of a transmission line. Assuming that the voltage in a steady state is $V_N$ and the back impedance of secondary conversion is $X_B$, and the line impedance is $X_L$, the voltage level is approximately equal to $V_N \times X_B/(X_B+X_L)$.

If, the percentage of a region in which a fault is to be detected is $\alpha$ % of the section to be protected, the operating value of the undervoltage relay element (S-UV) 9C for detecting a close-up fault has only to be set at $V_N \times X_B/(X_B+X_L) \times \alpha/100$. This corresponds to the region S-UV indicated by the circle of the solid line within the circle of the broken line.

There are a number of computation methods of the undervoltage relay element (S-UV) 9C. For example, one of the methods is described in IEEJ Technical Report No. 641, "Basic Technology of Protective Relay System", p. 85. The operation of the undervoltage relay S-UV using these computation methods is generally performed at higher speed than the operation of the reactance relay and accordingly the undervoltage relay S-UV can detect a close-up fault at high speed.

Figure 15:
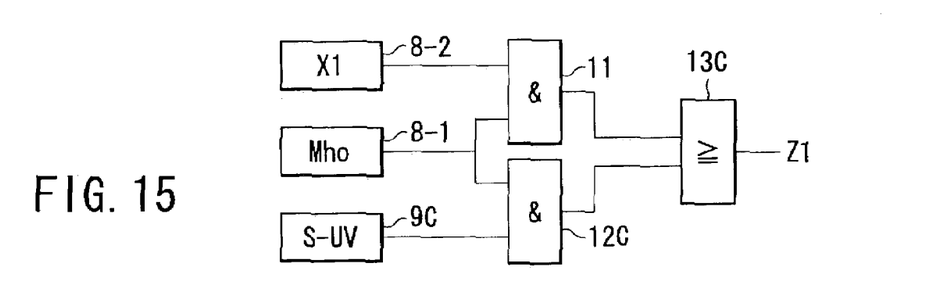
FIG. 15 is a diagram showing a logic sequence circuit from the output of each of relays according to the fifth embodiment of the present invention to the zone-1 operating output.

FIG. 15 is a diagram showing a logic sequence circuit in which the high-speed undervoltage relay element (S-UV) 9C is used as a high-speed close-up fault detection relay. In the logic sequence circuit, the high-speed undervoltage relay element (S-UV) 9C is substituted for the high-speed close-up fault detection relay element (S-Mho) 9 of the first embodiment shown in FIG. 4, the AND circuit 12C detects an AND condition between the relay element 9C and the directional relay element (Mho) 8-1, and the OR circuit 13C is supplied with the AND condition. Since the function of the distance relay apparatus according to the fifth embodiment is substantially the same as that of the distance relay apparatus according to the first embodiment, its descriptions are omitted.

Since the high-speed undervoltage relay element (S-UV) 9C, which detects that a voltage becomes not higher than a predetermined level, is used as a fault detection relay, a fault that has occurred in a zone that is much narrower than the protective zone of the zone-1 distance relay element 8-2 may be detected at high speed based on the voltage level.

The high-speed undervoltage relay element (S-UV) 9C used in the distance relay apparatus according to the fifth embodiment may be applied to the distance relay apparatus according to the second embodiment shown in FIG. 7.

Figure 16:
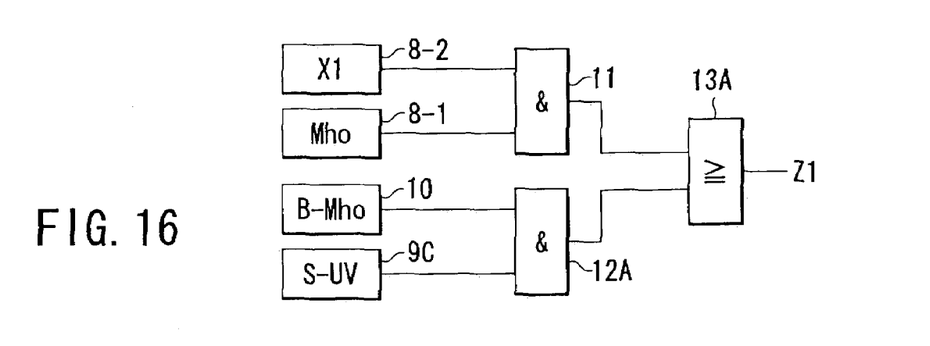
FIG. 16 is a diagram showing a logic sequence circuit from the output of each of relays to the zone-1 operating output when the fifth embodiment is applied to the second embodiment.

FIG. 16 is a diagram showing a logic sequence circuit from the output of each of relays to the zone-1 operating output when the high-speed undervoltage relay element (S-UV) 9C of the fifth embodiment is applied to the second embodiment. More specifically, as compared with the distance relay apparatus of the second embodiment shown in FIG. 7, the high-speed close-up fault detection relay element (S-Mho) 9 is replaced with the high-speed undervoltage relay element (S-UV) 9C and the AND circuit 12A detects an AND condition between the relay element 9C and a mho relay element (B-Mho) 10 exclusively for direction determination. As in the second embodiment, a high-speed operation can be maintained even though the setting value of the directional relay element (Mho) 8-1 is decreased according to the conditions for installing a power system, e.g., when a transmission line to be protected is short.

SIXTH EMBODIMENT

A sixth embodiment in accordance with the present invention will now be described with reference to FIGS. 17 to 19.

In the sixth embodiment, a high-speed overcurrent relay element (S-OC) 9D is used as a high-speed close-up fault detection relay.

Figure 17:
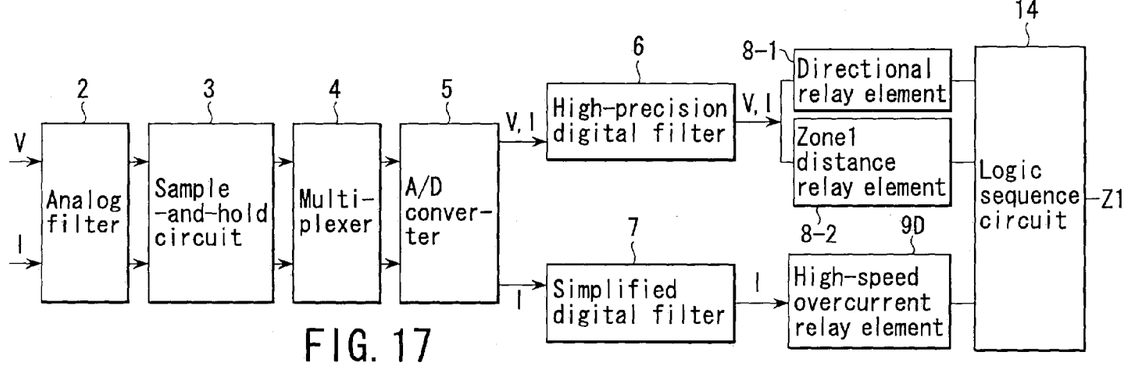
FIG. 17 is a block diagram of a distance relay apparatus according to a sixth embodiment of the present invention.

Since the components from an analog filter 2 to a zone-1 distance relay element 8-2 in FIG. 17 are the same as those of the first embodiment shown in FIG. 2, their descriptions are omitted. The characteristics of the high-speed overcurrent relay element (S-OC) 9D and the reasons for using the relay element 9D will be described below with reference to FIG. 18.

Figure 18:
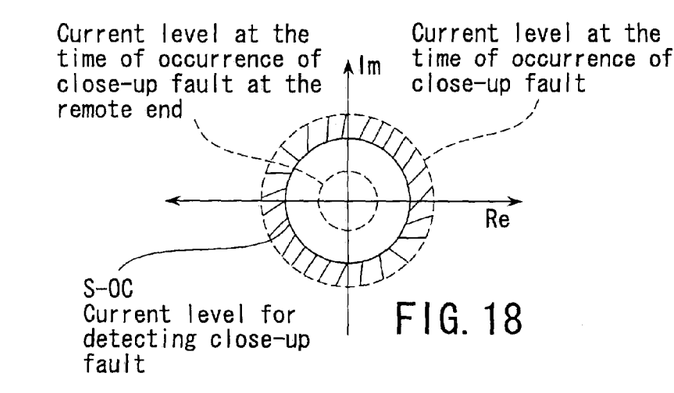
FIG. 18 is a diagram showing operating characteristics of a high-speed overcurrent relay element adopted in the fifth embodiment of the present invention.
Figure 19:
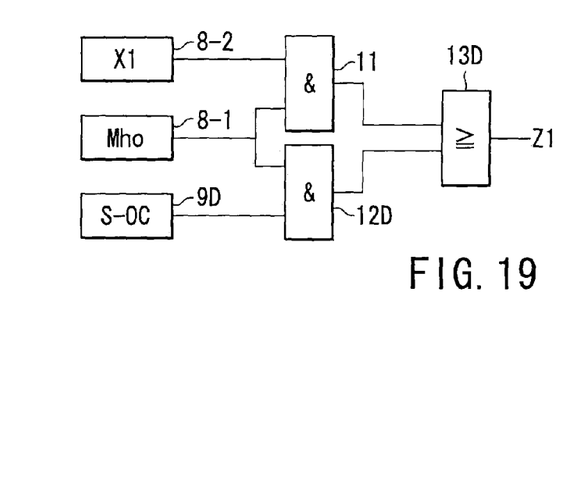
FIG. 19 is a diagram showing a logic sequence circuit from the output of each of relays according to the sixth embodiment of the present invention to the zone-1 operating output.

In FIG. 18, an outer circle of a broken line represents the level of current measured in a close-up fault and an inner circle of a broken line represents the level of current measured in a close-up fault at the remote end. An operating level has only to be set between both the current levels in order to detect a close-up fault, but actually it has only to be set at a value that is slightly lower than the current level of the outer circle indicated by S-OC in FIG. 18. The operating level depends upon back impedance $X_B$ and line impedance $X_L$. If the voltage in a steady state is $V_N$, the operating level will approximate a value expressed by $V_N/(X_B+X_L)$ in order to detect a fault that has occurred from a measurement point to a point represented by the line impedance $X_L$, (secondary conversion).

The principle of the computation method of the high-speed overcurrent relay element (S-OC) 9D is the same as that of the computation method of the high-speed undervoltage relay element (S-UV) 9C. FIG. 19 is a diagram showing a logic sequence circuit when the high-speed overcurrent relay element (S-OC) 9D is used as a high-speed close-up fault detection relay. In the logic sequence circuit, the high-speed overcurrent relay element (S-OC) 9D is substituted for the high-speed close-up fault detection relay element (S-Mho) 9 of the first embodiment shown in FIG. 4, the AND circuit 12D detects an AND condition between the relay element 9D and the directional relay element (Mho)

8-1, and the OR circuit 13D detects an OR condition between the AND circuits 11 and 12D.

Since the high-speed overcurrent relay element (S-OC) 9D, which detects that a current becomes not lower than a predetermined level, is used as a fault detection relay, a fault that has occurred in a zone that is much narrower than the protective zone of the zone-1 distance relay element 8-2 can be detected at high speed based on the current level.

The high-speed overcurrent relay element (S-OC) 9D used in the distance relay apparatus according to the sixth embodiment can be applied to the distance relay apparatus according to the second embodiment shown in FIG. 7.

Figure 20:
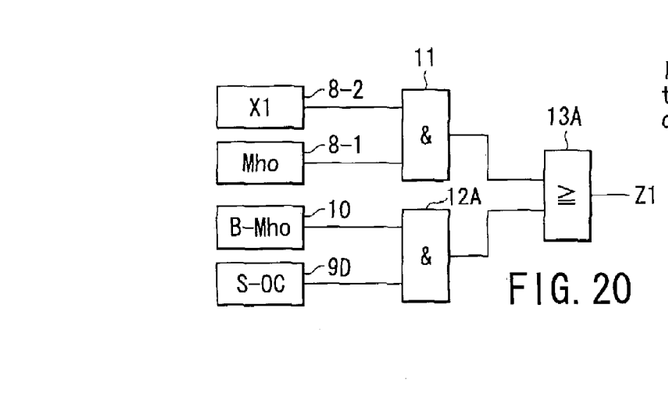
FIG. 20 is a diagram showing a logic sequence circuit from the output of each of relays to the zone-1 operating output when the sixth embodiment is applied to the second embodiment.

FIG. 20 is a diagram showing a logic sequence circuit from the output of each of relays to the zone-1 operating output when the high-speed overcurrent relay element (S-OC) 9D of the sixth embodiment is applied to the second embodiment. More specifically, as compared with the distance relay apparatus according to the second embodiment shown in FIG. 7, the high-speed close-up fault detection relay element (S-Mho) 9 is replaced with the high-speed overcurrent relay element (S-OC) 9D and the AND circuit 12A detects an AND condition between the relay element 9D and a mho relay element (B-Mho) 10 exclusively for direction determination. As in the second embodiment, a high-speed operation can be maintained even though the setting value of the directional relay element (Mho) 8-1 is decreased according to the conditions for installing a power system, e.g., when a transmission line to be protected is short.

SEVENTH EMBODIMENT

A seventh embodiment in accordance with the present invention will now be described with reference to FIGS. 21 to 23.

In the seventh embodiment, an impedance relay element (UZ) 9E is used as a high-speed close-up fault detection relay in place of the mho relay or the reactance relay that has bee described above.

There now follows a description of the impedance relay element (UZ) 9E used as a high-speed close-up fault detection relay.

Figure 21:
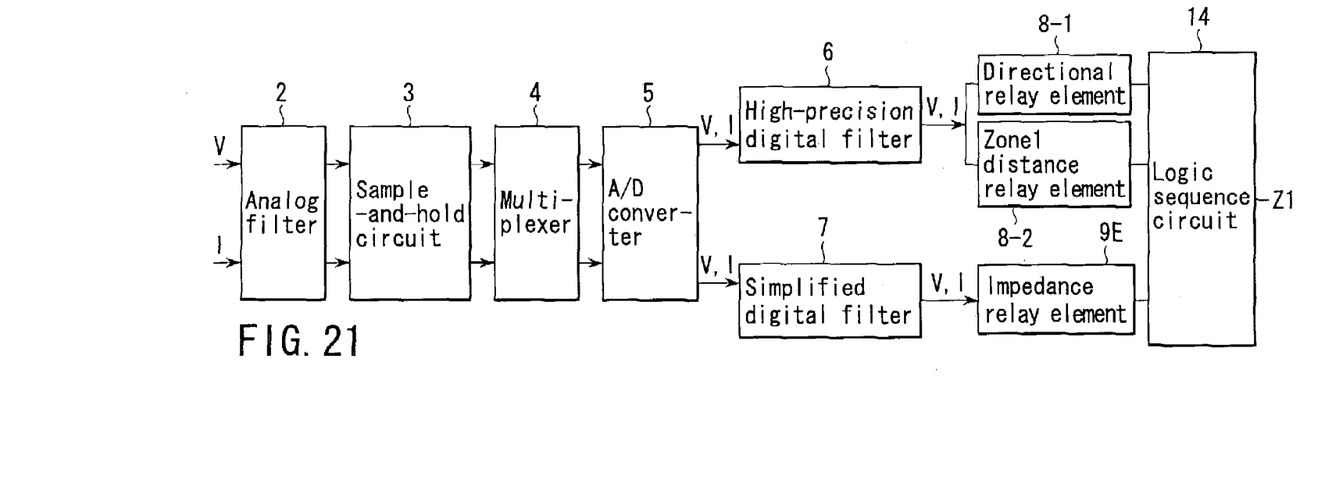
FIG. 21 is a block diagram of a distance relay apparatus according to a seventh embodiment of the present invention.

The components from an analog filter 2 to a zone-1 distance relay element 8-2 in FIG. 21 are the same as those of the first embodiment shown in FIG. 2. The impedance relay element (UZ) 9E is used as a high-speed close-up fault detection relay. The operating characteristics of the relay element 9E are shown in FIG. 22.

Figure 22:
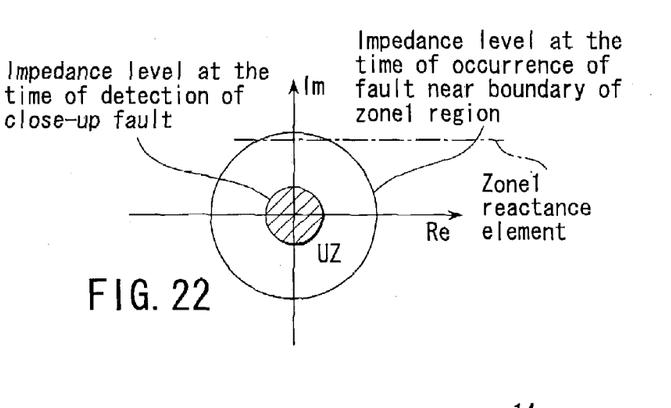
FIG. 22 is a diagram showing characteristics of the distance relay apparatus according to the seventh embodiment of the present invention.

In FIG. 22, an outer circle on the impedance plane represents the level of impedance from a relay installing point to a fault point when a fault occurs near the boundary between the zone-1 operating output and the zone-2 operating output (at a distance of about 80% from the relay installing point). Alternate long and short dashed lines indicate a reactance relay for detecting a zone-1 operating output. If there is no resistance at the fault point, the impedance in the fault that has occurred in the boundary between the zone-1 and zone-2 operating outputs corresponds to a value at the intersection of the outer circle and the reactance relay.

When the impedance relay element (UZ) 9E is used as a high-speed close-up fault detection relay, its operating level has only to be set at the impedance of a desired region (UZ) as defined by the inner circle in FIG. 22.

The impedance may be gotten by a plurality of methods; however, in principle, it has only to be done by dividing voltage by current. It may be considered that the operating speed depends upon a slower one of voltage computation speed and current computation speed according to the computation methods for obtaining the impedance. Actually, if the computation methods are the same, their computation speeds are almost equal to each other, with the result that a high-speed operation can be expected.

Figure 23:
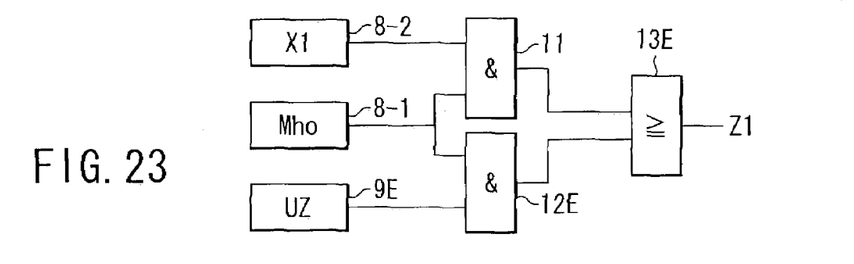
FIG. 23 is a diagram showing a logic sequence circuit from the output of each of relays according to the seventh embodiment of the present invention to the zone-1 operating output.

FIG. 23 is a diagram showing a logic sequence circuit of the distance relay apparatus according to the seventh embodiment. In the logic sequence circuit, the impedance relay element (UZ) 9E is substituted for the high-speed close-up fault detection relay element (S-Mho) 9 of the first embodiment, an AND circuit 12E detects an AND condition between the relay element 9E and the directional relay element (Mho) 8-1, and an OR circuit 13E detects an OR condition between the AND circuit 11 and the AND circuit 12E.

The impedance relay element 9E, which obtains an impedance from the voltage and current by computation and detects that the impedance becomes not higher than a predetermined level, is used as a fault detection relay to obtain a distance at a fault point. Thus, a fault that has occurred in a zone that is much narrower than the protective zone of the zone-1 distance relay element 8-2 can be detected at high speed.

The impedance relay element (UZ) 9E used in the distance relay apparatus according to the seventh embodiment can be applied to the distance relay apparatus according to the second embodiment shown in FIG. 7.

Figure 24:
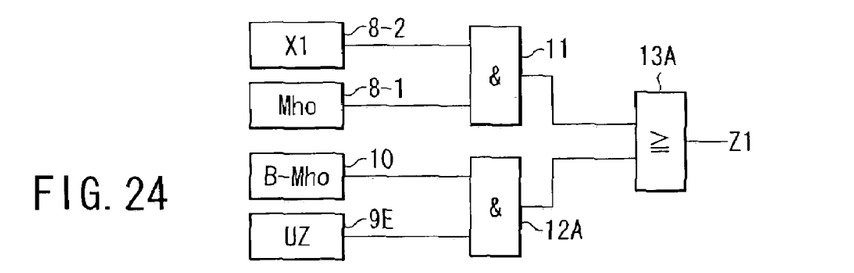
FIG. 24 is a diagram showing a logic sequence circuit from the output of each of relays to the zone-1 operating output when the seventh embodiment is applied to the second embodiment.

FIG. 24 is a diagram showing a logic sequence circuit from the output of each of relays to the zone-1 operating output when the impedance relay element (UZ) 9E of the seventh embodiment is applied to the second embodiment. More specifically, as compared with the distance relay apparatus according to the second embodiment shown in FIG. 7, the high-speed close-up fault detection relay element (S-Mho) 9 is replaced with the impedance relay element (UZ) 9E and the AND circuit 12A detects an AND condition between the relay element 9E and a mho relay element (B-Mho) 10 exclusively for direction determination. As in the second embodiment, a high-speed operation can be maintained even though the setting value of the directional relay element (Mho) 8-1 is decreased according to the conditions for installing a power system, e.g., when a transmission line to be protected is short.

According to all the embodiments, the distance relay apparatus may be tripped at high speed when a forward fault occurs in the vicinity of a relay installing point. Consequently, the power system can be improved in stability.

In the embodiments described above, a relay computation is performed by supplying the relays with data that is filtered through the digital filters. The digital filters and the relays (directional relay element, zone-1 distance relay element, and high-speed close-up fault detection relay element) are provided separately from each other. However, the filtering of the digital filters may be included in the computation principles of the relay (see, for example, IEEJ Lecture on Protection Relay, p. 112, Table 6.29). In this case, as shown in FIG. 2, the digital filters and the relays cannot clearly be separated from each other. In the foregoing embodiments, a combination of digital filters and relays is referred to as a directional relay element, a zone-1 distance relay element, and a high-speed close-up fault detection relay element.

Furthermore, the high-speed close-up fault detection relay element 9, the small-setting-value zone-1 reactance relay element 9A, the small-setting value impedance relay element 9B, the high-speed undervoltage relay element 9C, the high-speed overcurrent relay element 9D and the impedance relay element 9E are generally called a fault detection relay element.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

This application is based upon and claims the benefit of priority from the prior Japanese Patent Application No. 2002-200246, filed Jul. 9, 2002, the entire contents of which are incorporated herein by reference.

What is claimed is:

1. A distance relay apparatus comprising:
    a sampling element which samples an amount of electricity of a voltage and a current, which are received from an object to be protected, at regular intervals;
    an A/D converting element which converts the amount of electricity sampled by the sampling element into digital data;
    a first digital filter which filters the digital data obtained by the A/D converting element;
    a second digital filter which filters the digital data obtained by the A/D converting element, for a time period that is shorter than that required for filtering of the first digital filter;
    a first directional relay element which receives the digital data filtered by the first digital filter to perform computation to detect a fault, which occurs in the forward direction from an installing point of the relay apparatus, based on a computing equation;
    a zone-1 distance relay element which receives the digital data filtered by the first digital filter to perform computation to detect a fault within a predetermined zone viewed from the installing point of the relay apparatus, based on a computing equation;
    a fault detecting relay element which receives the digital data filtered by the second digital filter to perform computation to detect a fault within a zone that is narrower than the predetermined zone in terms of data time length which is shorter than that used for the computation of the zone-1 distance relay element; and
    a logic element which outputs a relay signal in accordance with a detecting operation of at least one of the zone-1 distance relay element and the fault detecting relay element and a detecting operation of the first directional relay element.

2. The distance relay apparatus according to claim 1, further comprising a second directional relay element having a setting value that is larger than that of the first directional relay element, and
    wherein the logic element outputs the relay signal in one of a case where both the second directional relay element and the fault detecting relay element are operated and a case where both the first directional relay element and the zone-1 distance relay element are operated.

3. The distance relay apparatus according to claim 1, wherein the fault detecting relay element includes a mho relay having a setting value that is smaller than a distance setting value of the zone-1 distance relay element.

4. The distance relay apparatus according to claim 1, wherein the fault detecting relay element includes a reactance relay having a setting value that is smaller than a distance setting value of the zone-1 distance relay element.

5. The distance relay apparatus according to claim 1, wherein the fault detecting relay element includes an undervoltage relay which detects that a voltage becomes not higher than a predetermined level.

6. The distance relay apparatus according to claim 1, wherein the fault detecting relay element includes an overcurrent relay which detects that a current becomes not lower than a predetermined level.

7. The distance relay apparatus according to claim 1, wherein the fault detecting relay element includes an impedance relay which obtains an impedance from the voltage and the current by computation and detects that the impedance becomes not higher than a predetermined level.

8. A distance relay apparatus comprising:
    a sampling element which samples an amount of electricity of a voltage and a current, which are received from an object to be protected, at regular intervals;
    an A/D converting element which converts the amount of electricity sampled by the sampling element into digital data;
    digital filters which filter the digital data obtained by the A/D converting element;
    a first directional relay element which receives the digital data filtered by one of the digital filters to perform computation to detect a fault, which occurs in the forward direction from an installing point of the relay apparatus, based on a computing equation;
    a zone-1 distance relay element which receives the digital data filtered by the one of the digital filters to perform computation to detect a fault within a predetermined zone viewed from the installing point of the relay apparatus, based on a computing equation;
    a fault detecting relay element which receives the digital data filtered by the other of the digital filters to perform computation to detect a fault within a zone that is narrower than the predetermined zone in terms of data time length which is shorter than that used for the computation of the first directional relay element and the zone-1 distance relay element; and
    a logic element which outputs a relay signal in accordance with a detecting operation of at least one of the zone-1 distance relay element and the fault detecting relay element and a detecting operation of the first directional relay element.

9. The distance relay apparatus according to claim 8, wherein the fault detecting relay element includes a mho relay having a setting value that is smaller than a distance setting value of the zone-1 distance relay element.

10. The distance relay apparatus according to claim 8, wherein the fault detecting relay element includes a reactance relay having a setting value that is smaller than a distance setting value of the zone-1 distance relay element.

11. The distance relay apparatus according to claim 8, wherein the fault detecting relay element includes an undervoltage relay which detects that a voltage becomes not higher than a predetermined level.

12. The distance relay apparatus according to claim 8, wherein the fault detecting relay element includes an overcurrent relay which detects that a current becomes not lower than a predetermined level.

13. The distance relay apparatus according to claim 8, wherein the fault detecting relay element includes an impedance relay which obtains an impedance from the voltage and the current by computation and detects that the impedance becomes not higher than a predetermined level.

14. The distance relay apparatus according to claim 13, further comprising a second directional relay element having a setting value that is larger than that of the first directional relay element, and wherein the logic element outputs the relay signal in one of a case where both the second directional relay element and the fault detecting relay element are operated and a case where both the first directional relay element and the zone-1 distance relay element are operated.

* * * * *